No. 731,043. PATENTED JUNE 16, 1903.
E. GATES.
SEPARATING DIAMAGNETIC METAL FROM SANDS, &c.
APPLICATION FILED APR. 14, 1900. RENEWED JAN. 13, 1903.
NO MODEL.
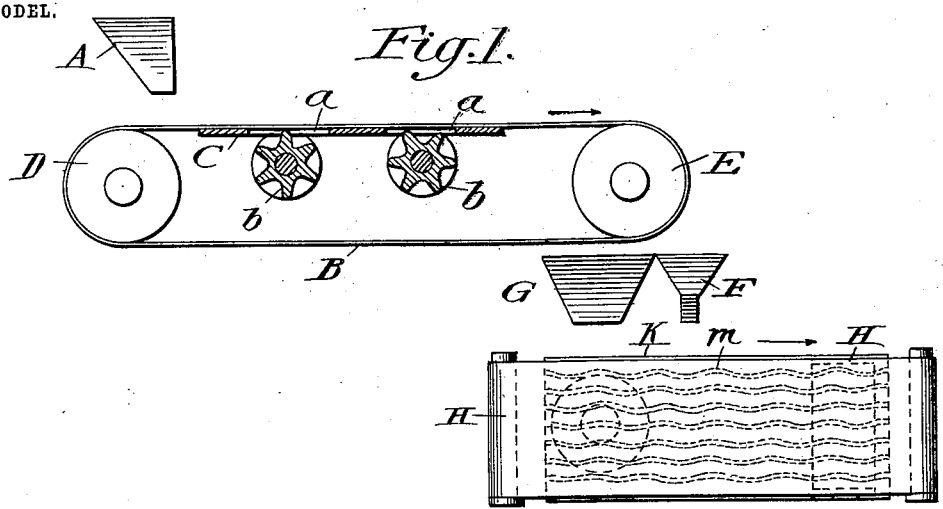
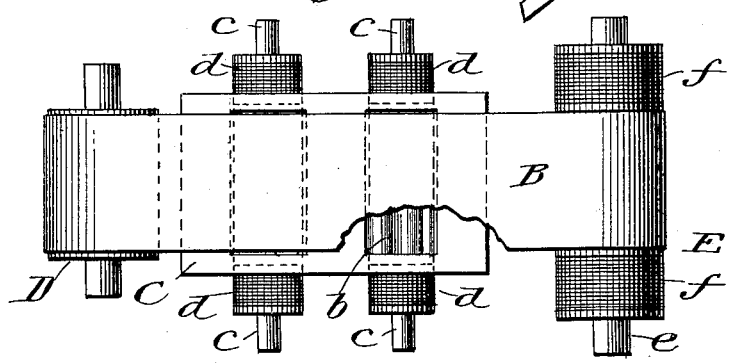
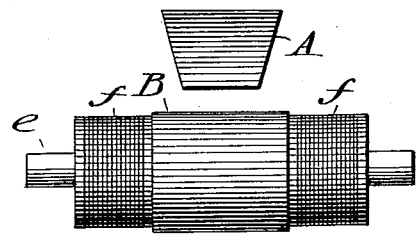
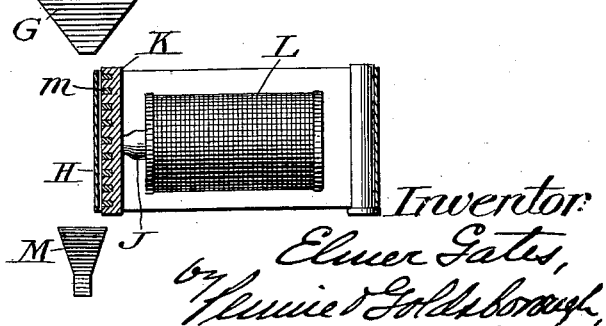
Witnesses:
D. W. Edelin.
M. B. Cole
Inventor:
Elmer Gates,
by Jennie Goldsborough,
Attys.

No. 731,043. Patented June 16, 1903.

UNITED STATES PATENT OFFICE.

ELMER GATES, OF CHEVY CHASE, MARYLAND, ASSIGNOR TO THEODORE J. MAYER, OF WASHINGTON, DISTRICT OF COLUMBIA.

SEPARATING DIAMAGNETIC METAL FROM SANDS, &c.

SPECIFICATION forming part of Letters Patent No. 731,043, dated June 16, 1903.

Application filed April 14, 1900. Renewed January 13, 1903. Serial No. 138,825. (No model.)

*To all whom it may concern:*

Be it known that I, ELMER GATES, a citizen of the United States, residing at Chevy Chase, Montgomery county, State of Maryland, have invented certain new and useful Improvements in Separating Diamagnetic Metal from Sands and the Like; and I do hereby declare the following to be a full, clear, and exact description of the invention, such as will enable others skilled in the art to which it appertains to make and use the same.

My invention relates to certain new and useful improvements in the separation of free particles of diamagnetic metal—such as gold, copper, or the like—from other diamagnetic material with which it is associated—as, for instance, in sea-sands, placer-sands, and alluvial deposits generally.

A characteristic feature of my invention consists in effecting an initial separation and concentration of the diamagnetic metallic particles by admixing with the sand or like material containing them a quantity—say from five to ten per cent.—of magnetic sand (magnetic oxid of iron) or a quantity of finely-divided iron, nickel, or similar magnetic material of relatively high specific gravity, stirring the mixture in the presence of water, and permitting it finally to settle. I have ascertained that by this expedient the particles of gold or other diamagnetic metal, together with the particles of magnetic material, sink to the bottom of the containing vessel and form a lower layer or layers wherein the diamagnetic metallic particles are so entangled with the magnetic particles as to be readily separated therewith from the main residue of diamagnetic sand by means of ordinary magnetic separators, thereby giving as the result of this initial operation a mixture of magnetic material and diamagnetic metallic particles which may be at once separated by being subjected to the action of another separator particularly adapted for that purpose. During this concentrating operation or subsequent thereto I may conveniently remove the greater portion of the upper layers of diamagnetic sand, thereby disembarrassing the operation from the further presence of the superfluous sand, which will be found to contain but little or none of the metallic particles to be recovered. The remainder of the mass, containing what is left of the diamagnetic sand and also containing the magnetic particles and the particles of diamagnetic metal enmeshed therewith, is thereupon dried and subjected to the action of apparatus of a type illustrated in the accompanying drawings for the purpose, first, of separating the diamagnetic sand, and, secondly, of disentangling and separating the diamagnetic metal from the magnetic particles.

In the drawings, Figure 1 represents a side elevation, partly in section, of apparatus adapted for the practice of my invention. Fig. 2 represents a plan view of a part of said apparatus with a portion of the feed-apron shown as broken away; and Fig. 3 represents an end elevation of the apparatus, partly in section.

Similar letters of reference indicate similar parts throughout the several views.

Referring to the drawings, A indicates a suitable feed-hopper for the reception of the dried concentrates hereinbefore referred to, and B a feed-apron whose upper strand passes over a brass platform or table C, having suitable openings $a$, below which are located the fluted magnet-cores $b$, the relation of the magnets to the apron being such that as the magnets revolve they will slightly jostle the upper strand of the apron, and consequently the material thereon. To this end the magnet-cores $b$ are mounted upon revoluble shafts $c$, carrying the energizing-coils $d$, within which the shafts $c$ turn freely and at a rate which may be graduated to be either of the same speed as that of the feed-apron or preferably at either a greater or less speed than said feed-apron. The feed-apron passes over the roller D and over the magnetic roller E, which may conveniently consist of a hollow iron cylinder mounted upon a shaft $e$, which shaft carries the energizing-coils $f$. Below the cylinder E are located the hoppers F G.

The dried material to be separated, resulting from the preliminary concentration hereinbefore referred to and containing the diamagnetic material and the entangled gold, copper, or the like, is fed from the hopper A upon the feed-apron B and travels upon said feed-apron in the direction indicated by the arrow. In its passage over the feed-apron the jostling exerted by the fluted magnets $b$ upon the feed-apron causes the particles of greater specific gravity to settle toward the surface of the apron. The action of the magnets $b$, moreover, causes the apron to be pulled downward slightly into the successive spaces existing between the corrugations of said magnets. This downward pull upon the belt is due to the attraction exercised by the magnets $b$ upon the magnetic material on the upper surface of the belt and results in further entangling the gold or other diamagnetic metal with the magnetic particles and causes the entangled material to arrange itself in a series of ridges transverse to the longitudinal movement of the feed-apron.

The magnetic material, with the entangled gold or other diamagnetic metal, is thus finally brought to the bottom of the traveling body of material, the upper layer consisting, in the main, of diamagnetic sand. The material finally passes over the magnetic cylinder E. The diamagnetic sand thereupon drops into the hopper F, from which it is conveyed to any suitable place of deposit. The magnetic material, on the contrary, together with its entangled particles of gold or other diamagnetic metal, is carried around by the feed-apron and drops into the hopper G. From the hopper G it passes to the second separator, which latter separator is of a type having the general characteristics set forth in my pending application for Letters Patent, Serial No. 9,269, filed March 19, 1900, and which I will now briefly describe.

The second separator consists of a feed-apron H, passing over suitable rollers, as shown, and having immediately in the rear of its forward strand a magnet-pole K, whose core J is energized by the magnet coil L. The pole-face K of the magnet is provided with a series of zigzag grooves, which may conveniently be filled with lead, as indicated at $m$ in Fig. 3, so as to establish across the face of the magnet-pole a series of zigzag or wavy fields of force along which the magnetic material must pass as it is carried along by the feed-apron H.

The magnetic material containing the entangled gold or the like is dropped from the hopper G, as indicated, and immediately collects upon the face of the feed-apron H and establishes itself thereon in wavy lines corresponding to the wavy or zigzag fields of force of the magnet-pole K. As fully set forth in my application referred to, the magnet-coil L must be energized to just such a degree as to form frond-like structures which continually change their distribution and arrangement in their endeavor to follow the wavy or zigzag lines of force as the feed-apron H carries the structures over the face of the magnet-pole. The particles of gold or other diamagnetic metal become disentangled and sifted out from the diamagnetic material during this operation and fall into a receiving-hopper M. The magnetic material, being held to the feed-apron by the attraction of the pole, is carried on in the direction indicated by the arrow and may be either swept from the apron or may accumulate at the extreme end of the magnet-pole and drop off by gradual accretion, or the attraction at or near the end of the magnet-pole may be neutralized by locating in the rear of the extreme end of the magnet-pole a large body of soft iron, as indicated in dotted lines, for the purpose of diverting the magnetic lines of force into the said body of soft iron, as will be readily understood.

When in the preliminary construction referred to I employ particles of metallic iron, I make them of approximately uniform size and preferably load them—$i.$ $e.$, increase their specific gravity—by coating the individual particles with lead or the like or otherwise mechanically associating them individually therewith.

It will of course be understood that the magnets $b$ may be energized in other ways than by the coils $d$. Moreover, the magnet E may be stationary instead of revoluble and may be energized in any other suitable manner than that shown. So, also, the separator for disentangling and separating the diamagnetic metal from the magnetic material may be varied in its detailed structure, provided it retains the basal principles of operation upon which its action depends. In fact, while I regard the illustrated structure as peculiarly adapted to the practice of my invention, my invention, broadly considered, is not limited to its specific details. For instance, so far as I am aware, it is broadly new to concentrate particles of diamagnetic metal from a mixture of diamagnetic material containing them by causing said particles to be entangled or enmeshed with magnetic material added to the mass and to subsequently disentangle the gold from the concentrate. I desire, therefore, that my claims hereunto annexed be given an interpretation commensurate with their fair import.

Having thus described my invention, what I claim is—

1. In the art of separating free particles of diamagnetic metal (such as gold, copper, and the like), from other diamagnetic material (such as sand) with which they are associated, the preliminary method of first roughly segregating the diamagnetic metal from the mass, and then separating the remaining sand from the segregated material, which consists in admixing particles of magnetic material with the mass, enmeshing or entangling the diamagnetic metallic particles thereby, concentrating the combined metallic particles and diamagnetic metallic particles, and removing the remaining sand therefrom, by passing the concentrate through a magnetic field, and diverting the mixture of magnetic particles and diamagnetic metallic particles into a different path of collection from that of the particles of sand; substantially as described.

2. The art of separating free particles of diamagnetic metal (such as gold, copper, and the like) from other diamagnetic material with which they are associated, which consists in first, roughly segregating the diamagnetic metallic particles from the mass, by admixing particles of magnetic material with the mass, enmeshing or entangling the particles of diamagnetic metal thereby, and concentrating the mixture of magnetic particles and diamagnetic metal; secondly, diverting the residual sand contained in said concentrate from the mixture of entangled magnetic material and diamagnetic metal, by passing the concentrate through a directing magnetic field of force; and then passing the said mixture through a magnetic field of such graduated force as to cause the particles to arrange themselves in frond-like structure, causing a succession of rearrangements of said structures, thereby disentangling the diamagnetic metallic particles therefrom, and collecting said diamagnetic metallic particles as they become disentangled; substantially as described.

In testimony whereof I affix my signature in presence of two witnesses.

ELMER GATES.

Witnesses:
JOHN C. PENNIE,
J. E. HUTCHINSON, Jr.